3,164,392
BOAT SUPPORTING DOLLY
Frank B. Lane, Annapolis, Md., assignor to Berliner Development Company, a corporation of Maryland
Filed Dec. 29, 1961, Ser. No. 163,303
2 Claims. (Cl. 280—47.13)

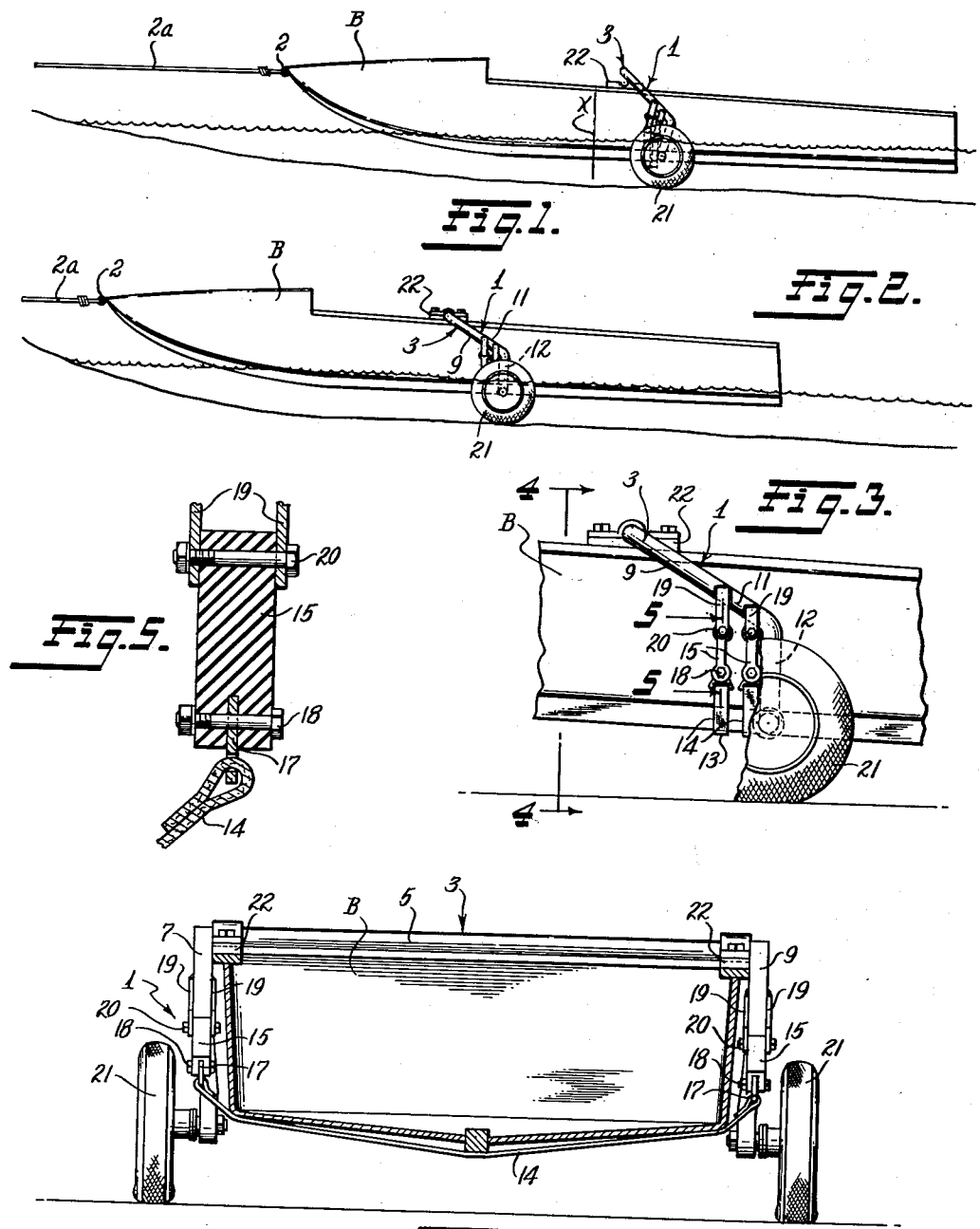

This invention relates generally to load-carrying trailer means and, more particularly, to means specifically designed for hauling small boats or the like behind a towing vehicle, such as a car or truck.

The boat trailer of the present invention is specifically designed to support the boat firmly, to absorb the impact of jarring in transit, and to protect the load to the fullest extent from the wear and tear of normal towing operations. Further, the trailer is adapted for convenient loading and unloading of the boat, either from a floating position in the water or from a position on dry land.

It is a primary object of the present invention to provide a boat trailer that can be readily loaded or unloaded whether the boat is in the water or on dry land.

Another object of the invention is to provide boat trailer means which are rigid and compact in construction and which may therefore be conveniently stored when not in use.

Another object of the invention is to provide boat trailer means which can be readily adapted to support boats or other loads of slightly different shapes and sizes.

Another object of the invention is to provide a boat trailer which is economical in construction and durable in use.

Other objects and advantages will be apparent from the following specification when taken in conjunction with the accompanying drawings, in which:

FIG. 1 is a side elevational view of a boat trailer constructed in accordance with the principles of the present invention, the boat being illustrated here in the process of being loaded from a floating position;

FIG. 2 is a similar side elevational view, showing here the boat in fully loaded position;

FIG. 3 is a fragmentary side elevation;

FIG. 4 is a sectional view taken on the line 4—4 of FIG. 3; and

FIG. 5 is an enlarged sectional view taken on the line 5—5 of FIG. 3.

Referring now more specifically to the drawings, the boat trailer of the present invention comprises a boat-cradling and supporting assembly, generally indicated by the numeral 1, which is wheeled and is adapted to support a boat B centrally thereof or slightly to the rear of its center of gravity, which has been indicated by the line X. A towing attachment 2 of any known type is secured to the bow of the boat for attachment of a towline 2a to the rear of a car or the like.

The assembly 1 comprises a U-shaped frame 3 which may conveniently be formed of tubular steel or other material of rigid and durable quality. Frame 3 comprises a transverse bight member 5 having leg members 7 and 9 depending downwardly from the opposite ends thereof. In the specific construction shown each leg is provided with an upper portion 11 inclined rearwardly and terminating in a lower vertical leg portion 12.

A sling member 13 is attached at opposite ends to the upper leg portions 11 and in its present form comprises a pair of flexible strap members 14 arranged in side-by-side relation. Each strap member 14 is secured at either end thereof to the lower extremity of a high-strength resilient rubber link 15, as by connector members 17 embedded in the rubber and secured by bolt means or the like 18. The upper extremities of rubber links 15 are pivotally secured between pairs of metallic strap members 19, as by bolts 20. The straps 19 are welded or otherwise secured in pairs to the respective upper leg portions 11. The overall length of the sling assembly must be sufficient to provide a loop which extends below transverse member 5 a distance greater than the depth of the boat or other article to be gripped thereby when the legs 7 and 9 are in the loaded position illustrated in FIG. 2. This length, howeover, must not be too great, for reasons which will appear hereinafter and any suitable adjusting means (not shown) may be employed to insure an accurate adjustment of the length.

Wheels 21 are mounted adjacent the lower end of each leg in any suitable manner and conventional shock-absorbing means (not illustrated) may be included.

The boat B with which the aforedescribed trailer is used may be of any construction or design, a single trailer being adaptable to minor differences in size or cross-sectional configuration and trailers of differing dimensions being employed where major differences in size and configuration are encountered.

In the embodiment illustrated the boat B is provided with a pair of bracket members 22 disposed in corresponding positions along the upper edge of each gunnel rail, preferably slightly to the rear of the center of gravity X. The primary function of these bracket assemblies is to prevent the forward or rearward movement of the boat with respect to the sling rather than to hold the transverse number 5 in direct contact with the boat. This latter function is achieved by a clamping effect described hereinbelow.

In the loading operation as illustrated in FIG. 1 the vertical leg portions 12 are pivoted forwardly to increase the space between the sling and the transverse member 5. Thus the frame 3 may be slipped over one end of a boat, which may be afloat as illustrated, until the transverse member 5 is received and secured in the brackets 22. In this operation the sling passes freely under the bottom of the boat. The legs 7 and 9 are then pivoted rearwardly until the sling is brought into direct contact with the bottom of the boat hull and at this point the boat is firmly gripped between the transverse member 5 at the top and the sling at the bottom. The weight of the boat tends to maintain trailer frame 3 in this clamping position with any road shock or other jarring being absorbed by the elasticity of the sling. The rearward rotation of the legs 7 and 9 will be automatically effected if the boat is moved from the position shown in FIG. 1 into shallower water and on to dry land.

It should be specifically noted that the length of the sling 15 cannot be so great as to eliminate the desired amount of clearance between the boat hull and the ground when the legs 7 and 9 are in rearwardly pivoted position.

It will be understood that numerous changes and modifications may be made in the manner of use, the materials employed and the specific construction and arrangement of elements described without departing from the spirit of the invention or the scope of the annexed claims.

I claim:

1. In combination: a boat; a frame member of inverted U-shape straddling said boat centrally along the length thereof; said frame member including a transverse bight portion disposed across the top of said boat and a pair of legs extending downwardly and rearwardly from the opposite end portions of said bight portion adjacent the sides of said boat; ground engaging wheels mounted on the lower end portions of said legs; means for rotatably and releasably securing said bight portion against fore and aft movement across the top of said boat while permitting rotation of said bight portion with respect thereto; and flexible sling means secured at either end to said legs at points spaced below the level of said bight portion and extending between said legs to pass under the bottom of said boat, said sling means being of sufficient length to pass loosely below the bottom of said boat when said frame member is moved into a generally upright position but being sufficiently short to clamp said boat in position against said transverse bight portion when said legs are inclined rearwardly to an angled position wherein said boat may be towed.

2. The combination of claim 1 wherein said legs, when in operative position, each comprise upper portions inclined rearwardly and merging into lower portions lying in a generally vertical plane which is spaced rearwardly from the vertical transverse plane containing said transverse portion.

References Cited by the Examiner
UNITED STATES PATENTS

| | | | |
|---|---|---|---|
| 2,042,598 | 6/36 | Harvey | 280—414 |
| 2,489,414 | 11/49 | Holmes | 280—414 |
| 2,494,110 | 1/50 | Stiller | 280—414 X |
| 2,529,925 | 11/50 | Donaldson et al. | |
| 2,539,693 | 1/51 | McClintock. | |
| 2,545,128 | 3/51 | Young et al. | 214—373 |
| 2,664,577 | 1/54 | Sanborn | 280—414 |
| 2,667,984 | 2/54 | Prochl | 280—414 X |
| 3,068,024 | 12/62 | Berliner | 280—414 |

A. HARRY LEVEY, *Primary Examiner.*